(12) United States Patent  (10) Patent No.: US 7,538,543 B2
Nicolosi  (45) Date of Patent: May 26, 2009

(54) REDUNDANT PEDAL POSITION SENSOR

(75) Inventor: Joseph M. Nicolosi, Fort Wayne, IN (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 97 days.

(21) Appl. No.: 11/285,713

(22) Filed: Nov. 21, 2005

(65) Prior Publication Data

US 2006/0113989 A1  Jun. 1, 2006

Related U.S. Application Data

(60) Provisional application No. 60/631,482, filed on Nov. 29, 2004.

(51) Int. Cl.
*G01R 33/06* (2006.01)

(52) U.S. Cl. .................................. 324/207.2

(58) Field of Classification Search ............... 324/207.2, 324/207.11–207.26, 234–235, 240–243, 324/260, 205; 123/612, 617; 280/205
See application file for complete search history.

(56) References Cited

U.S. PATENT DOCUMENTS 6,020,736 A * 2/2000 Aoyama et al. ........ 324/207.21

FOREIGN PATENT DOCUMENTS

DE  4307544  * 9/1994

* cited by examiner

*Primary Examiner*—Reena Aurora

(57) ABSTRACT

A pedal position sensor provides a redundant pair of output signals that are indicative of the pedal position by providing a pair of shaped plates that are mounted on a pedal shaft. A single magnet generates a magnetic field that is changed depending on a position of at least on plate attached to the pedal shaft. Changes in the magnetic field are sensed by a first and second magnetic field sensor that produce independent outputs indicative of pedal shaft position.

5 Claims, 2 Drawing Sheets

REDUNDANT PEDAL POSITION SENSOR

REFERENCE TO RELATED APPLICATION

This application claims priority to U.S. Provisional Application No. 60/631,482 which was filed on Nov. 29, 2004.

BACKGROUND OF THE INVENTION

This invention relates generally to a pedal position sensor. More particularly, this invention relates to a pedal position sensor providing a redundant pair of signals indicative of pedal position.

Drive by wire applications are becoming more common with the use of electric and hybrid vehicles. Drive by wire utilizes sensors to determine a position of various controls such as accelerator or brake pedal position. The sensed position is then translated into a desired output such as engine speed. As appreciated, an error or malfunction in the sensor can result in undesirable or inconsistent performance.

Accordingly, it is desirable to develop a drive by wire sensor assembly that provides redundant signals to provide increased reliability and fail safe functions.

SUMMARY OF THE INVENTION

An example pedal position sensor according to this invention includes a magnet generating a magnetic field that changes responsive to a position of at least one plate disposed on a pedal shaft and first and second Hall Effect sensors that each generate an independent signal indicative of pedal shaft position.

The example pedal sensor assembly includes a pedal shaft that rotates about an axis. A magnet is disposed proximate to at least one plate supported on the pedal shaft. The magnet generates a magnetic field through a magnetic circuit formed by a pole piece and a portion of the at least one plate. Movement of the at least one plate causes a change in a strength of the magnetic field that is sensed by a first and second Hall effect sensor. The plates are shaped to provide a desired magnetic field strength relative to pedal shaft angle. The Hall effect sensors generate separate and independent outputs indicative of pedal position.

This invention also includes a method of determining a pedal position including the initial step of positioning a magnet relative to at least one plate movable responsive to movement of a pedal shaft. The magnetic field generated by the magnet and the changes caused by movement of the at least one plate is sensed first and second Hall effect sensors. The at least one plate is shaped to tailor changes in the magnetic field such that each of the hall effect sensors sense the strength of the magnetic field in a proportion indicative of shaft angle.

Accordingly, the pedal position sensor of this invention provides a simple sensor assembly providing redundant signals to increase accuracy and durability.

These and other features of the present invention can be best understood from the following specification and drawings, the following of which is a brief description.

DETAILED DESCRIPTION OF THE PREFERRED EMBODIMENT

Figure 1:
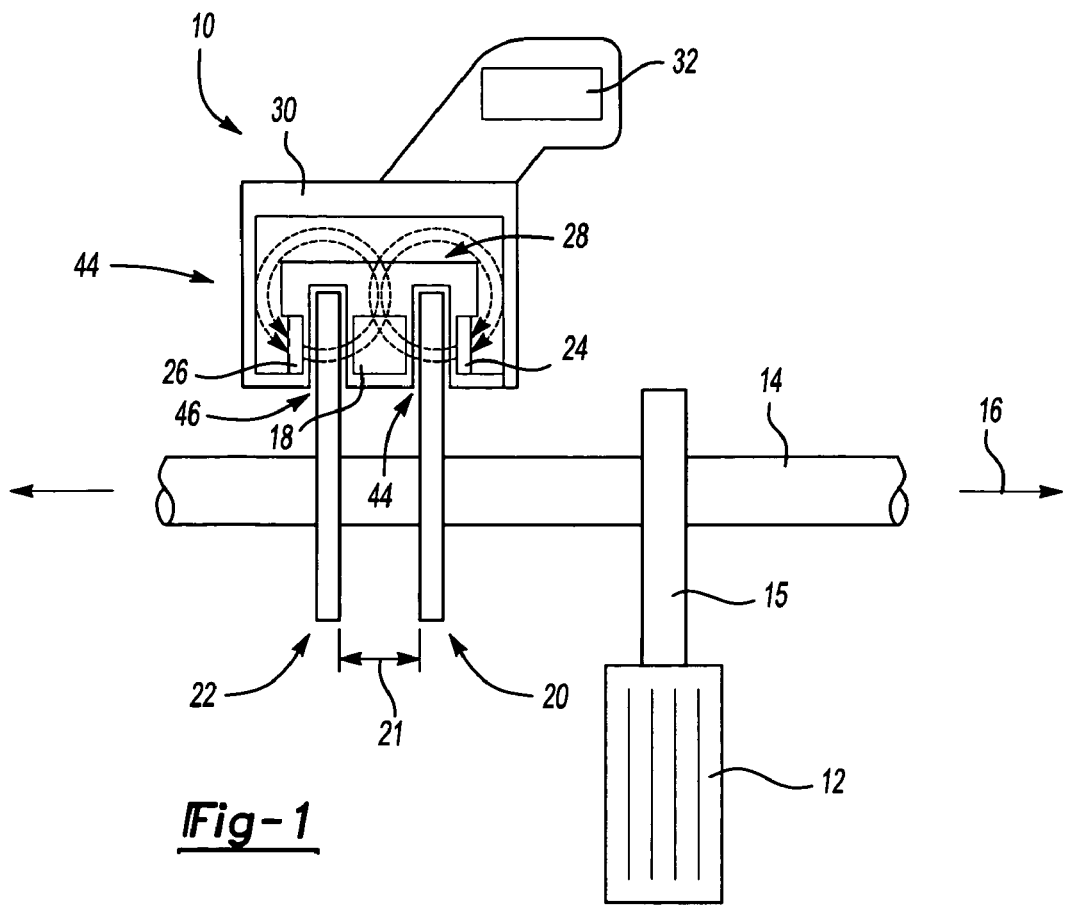
FIG. 1 is a cross-sectional view of an example pedal position sensor assembly according to this invention.

Referring to FIG. 1, a pedal position sensor assembly 10 is schematically shown and includes a pedal 12 mounted on a rod 15 that is suspended on a shaft 14. The shaft 14 rotates about an axis 16. Rotation of the shaft 14 around the axis 16 rotates a first plate 20 and a second plate 22 that are attached to the shaft 14. The first plate 20 and the second plate 22 are spaced a distance 21 apart. Within the spaced distance 21 is a magnet 18.

The pedal positional sensor assembly 10 is encased in a plastic housing 30. The plastic housing 30 may be overmolded or provided by a plastic potting process. As appreciated, the plastic housing 30 is formed from materials and process determined to fulfill application specific requirements. A pole piece 28 is disposed within the plastic housing 30 and supports the magnet 18. The pole piece 28 forms a portion of a magnetic circuit including the magnet 18, and the first and second plates 20, 22. A first and second Hall effect sensor 24, 26 are disposed within a space between the pole piece 28 and the first and second plates 24, 26. The pole piece 28 also supports the first Hall effect sensor 24 and a second Hall effect sensor 26. The plastic housing 30 includes a first slot 44 and a second slot 46. The first plate 20 rotates with the shaft 14 and within slot 44. The second plate 22 rotates with the shaft 14 within the second slot 46.

The Hall effect sensor 24, 26 are disposed to the outside of the plates 20, 22 with the magnet 18 disposed between the first and second plates 20, 22. Rotation of the shaft 14 causes a sequential blocking and unblocking that changes a strength of the magnetic field generated by the magnet 18 that is sensed by the Hall Effect sensors 24, 26. The Hall Effect 24, 26 sensors sense the change in the magnetic field caused by the movement of the first and second plates 20, 22 and changes to the he magnetic field provided by a tailored shape of the first plate 20 and the second plate 22.

The shape of the first and second plates 20, 22 is provided to modify the strength of the magnetic field responsive to rotation of the pedal shaft 14. Further, the plates may include a tailored thickness that modifies the magnetic field and provides the desired relationship between magnetic field strength and pedal shaft 14 angular position.

The plastic housing 30 includes a connector assembly 32. The connector assembly 32 provides electrical connections required for driving the Hall effect sensors 24, 26 and for receiving outputs from the Hall effect sensors 24, 26.

Figure 2:
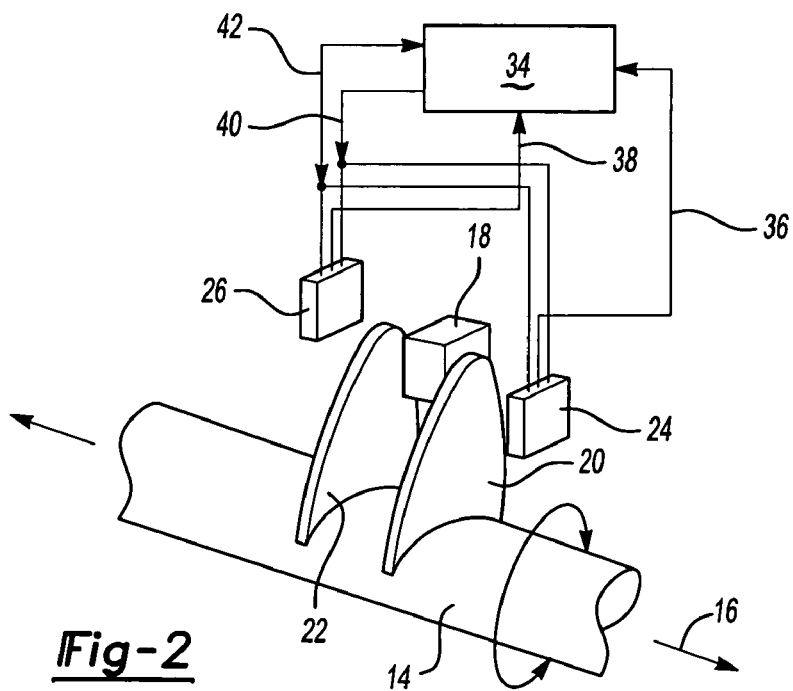
FIG. 2 is a schematic illustration of the pedal position sensor according to this invention.

Referring to FIG. 2, a schematic view of the pedal position sensor assembly 10 is illustrated. In this view, the magnet 18 is shown disposed between the first plate 20 and the second plate 22. Rotation of the shaft 14 causes the rotation of the first plate 20 and the second plate 22 concurrently. Rotation of the plates 20, 22 causes changes in the amount of the magnetic field generated by the magnet 18 that can be detected. Changes in the detected magnetic field sensed by each of the Hall effect sensors 24, 26 is caused by the tailored shape of each of the plates 20, 22.

A controller 34 provides a voltage supply 40 and also a ground 42 for each of the Hall effect sensors 24, 26. The controller 34 can be a dedicated device built into the sensor assembly, or a portion of an overall controller disposed remote from the sensor 10. Rotation for any position of the shaft 14 is detected by the magnitude of the magnetic field that is detected by each of the Hall effect sensors 24, 26. Each of the Hall effect sensors 24, 26 generates an independent and individual output 38, 36. In this way each of the outputs can be compared to each other to determine the accuracy of the date received.

In the schematic illustration of this invention shown in FIG. 2, the Hall effect sensor 24 is generating an output 36 and the Hall effect sensor 26 is generating an output 38. Outputs 36 and 38 are individual and independent of each other. In this way redundant sensing of the pedal shaft 14 position is provided. This redundant sensing provides the opportunity to compare and determine if the data actually received by the controller accurately indicates the rotational position of the shaft 14.

The first plate 20 and second plate 22 are made of a ferromagnetic material that causes changes in the magnetic field produced by the magnet. The first and second plates 20, 22 shunt the magnetic flux away from the Hall effect sensors 24, 26 thereby producing an output voltage that is proportional to the magnetic flux. The plates 20, 22 provide an interruptive function and are shaped to produce a desired relationship between pedal shaft rotation angle and the voltage output. Normally this is desired to be a linear relationship. However other relationships maybe required for application specific requirements which may be produced by specifically shaped moving the first plate 22 and the second plate 20.

The plates 20, 22 are arranged so that the voltage output will increase as the shaft angle increases. However, as appreciated, the plates 20, 22 maybe disposed and specifically configured such that increases in pedal shaft angle produce a corresponding decrease in output voltage.

Figure 3:
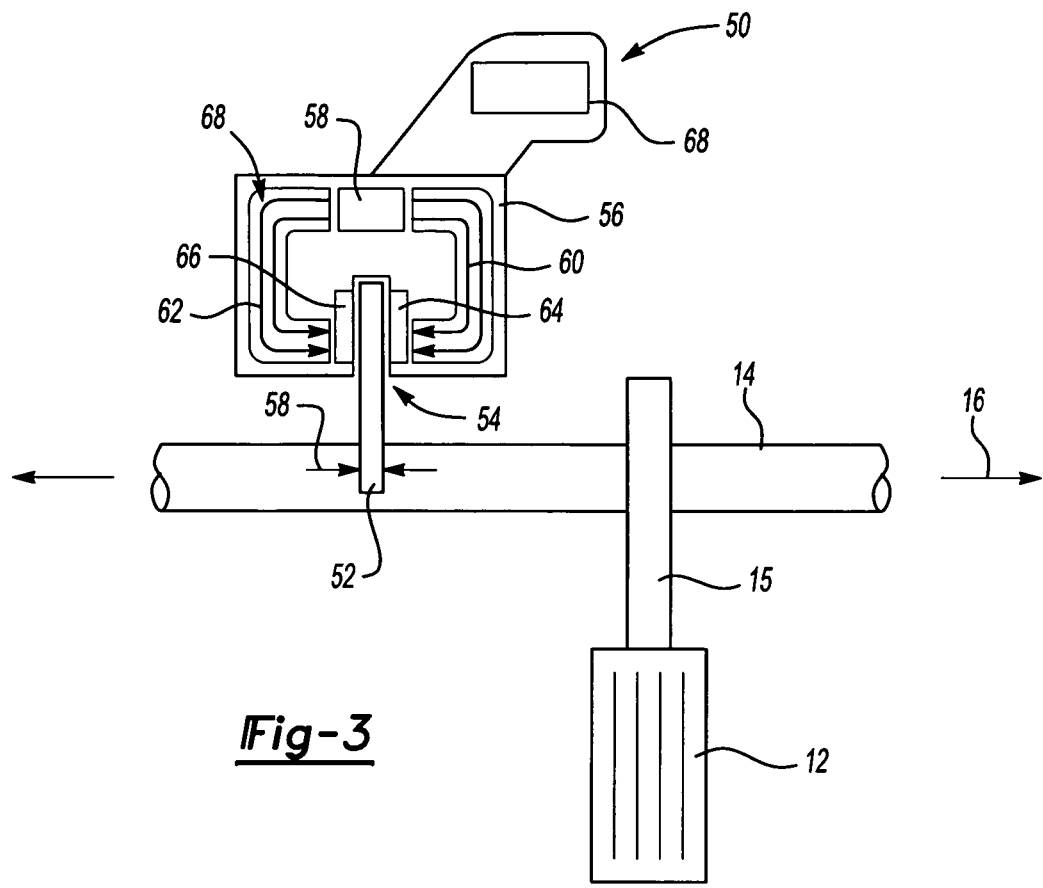
FIG. 3 is a schematic cross-section of another example pedal position sensor according to this invention.

Referring to FIG. 3, another example pedal position sensor 50 includes a magnet 58 that generates a magnetic field schematically shown at 68. The magnet 58 is part of a magnetic circuit including a first pole piece 60 and a second pole piece 62. The sensor 50 includes a housing 56 that supports the magnet 58, the pole pieces 60, 62 and defines a slot 54. A plate 52 on the pedal shaft 14 is movable within the slot 54 and causes a change in the magnetic field strength sensed by a first Hall effect sensor 64 and a second Hall effect sensor 66. The magnetic field strength sensed by the first and second Hall effect sensor is indicative of a position of the pedal shaft 14.

The plate 52 includes a shape and thickness 55 that is tailored to modify the magnetic field 68 according to a desired relationship to provide proportional change indicative of pedal shaft angular position. As appreciated, the change in the strength of the magnetic field may cause in increase with corresponding increases in angular position of the pedal shaft, or may cause a corresponding decrease that corresponds with angular position. This would translate to either an increase in a voltage output from the Hall effect sensors 60, 62 or a decrease in the voltage output.

Figure 4:
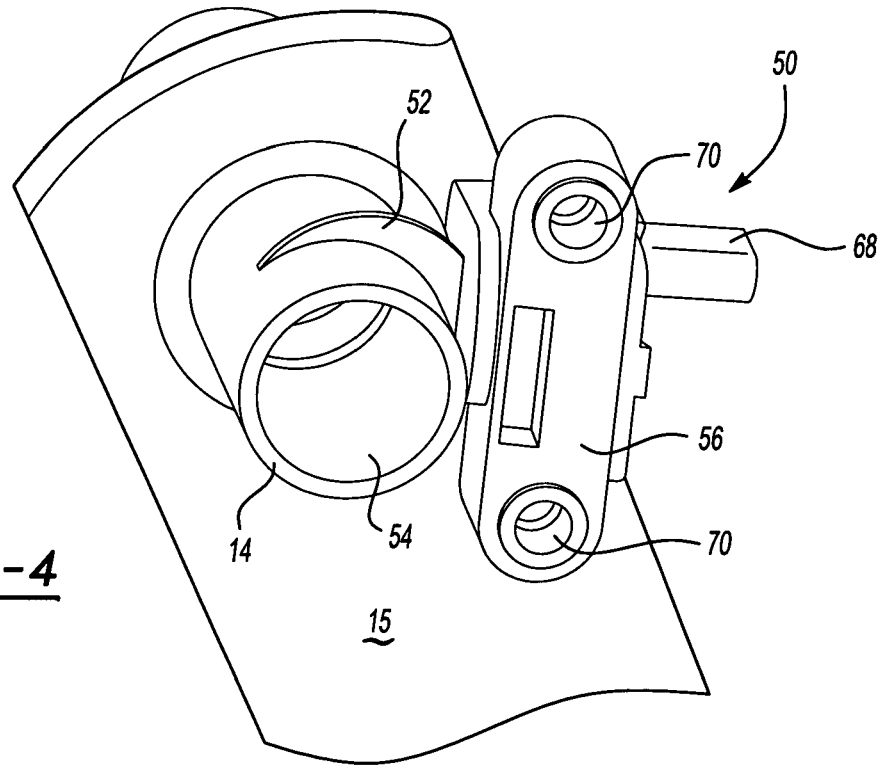
FIG. 4 is a perspective view of the example pedal position sensor of FIG. 3.

Referring to FIG. 4, the sensor 50 is shown and adjacent the pedal shaft 14 and with the plate 52 disposed within the slot 54. Rotation of the pedal shaft 14 cause the plate 52 to move further into or out of the slot 54 causing a corresponding change in the strength of the magnetic field sensed by the hall effect sensors 60, 62.

The housing 56 of the sensor 50 includes openings 70 for fastener to facilitate mounting. The housing 56 may include other features for mounting as may be required for specific applications. A connector 68 is integrally formed in the housing to facilitate the required electrical connections with the sensor 50. Other electrical connection schemes may also be employed to accommodate application specific requirements.

Accordingly, the pedal position sensor according to this invention provides for the reduction of redundant signals to improve durability and accuracy with the use of a single magnet. Further, specific outputs relative to shaft rotational angle can be produced by tailoring the plate shape to the desired output values.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sensor assembly for detecting pedal position comprising:
   a magnet generating a magnetic field;
   a first magnetic field sensor sensing the magnetic field generated by the magnet; and
   a second magnetic field sensor separate from the first magnetic field sensor for independently sensing the magnetic field;
   a first plate and a second plate spaced an axial distance from the first plate, wherein the magnet is disposed in a space between the first plate and the second plate, and the first magnetic field sensor and the second magnetic field sensor are disposed on an opposite side of the first and second plates from the magnet, wherein a strength of the magnetic field is changed according to movement of the first and second plates responsive to movement of the pedal shaft.

2. A sensor assembly for detecting pedal position comprising:
   a magnet generating a magnetic field;
   a first magnetic field sensor sensing the magnetic field generated by the magnet;
   a second magnetic field sensor separate from the first magnetic field sensor for independently sensing the magnetic field, wherein a strength of the magnetic field is changed according to movement of a first plate disposed proximate the magnet and movable responsive to movement of a pedal shaft;
   a second plate spaced an axial distance from the first plate and movable responsive to movement of the pedal shaft; and
   a pole piece including a first slot for the first plate and a second slot for the second plate and a center section disposed between the first slot and the second slot including the magnet, wherein movement of the first plate causes a change in the magnetic field sensed by the second magnetic field sensor by causing a change in a magnetic flux path of the magnetic field.

3. The assembly as recited in claim 2, wherein the pole piece supports the first magnetic field sensor and the second magnetic field sensor and defines a gap between the first and second magnetic field sensors and the magnet through which the first and second plates move.

4. A sensor assembly for detecting pedal position comprising:
   a pedal shaft;
   a magnet generating a magnetic field;
   a first plate proximate the magnet and movable responsive to movement of the pedal shaft;
   a second plate spaced apart from the first plate and proximate the magnet movable responsive to movement of the pedal shaft, wherein movement of the first plate and the second plate selectively block portions of the magnetic field to causes a change in the magnetic field;

a first magnetic field sensor sensing the magnetic field generated by the magnet; and a second magnetic field sensor separate from the first magnetic field sensor for sensing the magnetic field., wherein the magnet is disposed in a space between the first and second plates, and the first magnetic field sensor is disposed on a side of the first plate opposite the magnet and the second magnetic field sensor is disposed on a side of the second plate opposite the magnet.

5. The assembly as recited in claim 4, including a pole piece extending from a side opposite the magnet of the first plate to a side opposite the magnet of the second plate such that the first magnetic field sensor is disposed in a space between the pole piece and the first plate and the second magnetic field sensor is disposed in a space between the pole piece and the second plate, and a portion of the pole piece extends between the first and second plates to the magnet.

* * * * *